(12) United States Patent
Okamura et al.

(10) Patent No.: US 9,105,222 B2
(45) Date of Patent: Aug. 11, 2015

(54) DISPLAY CONTROL APPARATUS AND DISPLAY CONTROL METHOD

(75) Inventors: Shuichi Okamura, Kawasaki (JP); Yukari Yano, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 871 days.

(21) Appl. No.: 12/475,248

(22) Filed: May 29, 2009

(65) Prior Publication Data

US 2009/0300538 A1 Dec. 3, 2009

(30) Foreign Application Priority Data

Jun. 3, 2008 (JP) .................................. 2008-146178

(51) Int. Cl.
*G06F 3/0481* (2013.01)
*G09G 5/14* (2006.01)
*G06F 3/14* (2006.01)
*G09G 5/00* (2006.01)

(52) U.S. Cl.
CPC ................ *G09G 5/14* (2013.01); *G06F 3/0481* (2013.01); *G06F 3/1431* (2013.01); *G09G 5/00* (2013.01); *G09G 2340/0414* (2013.01); *G09G 2340/0421* (2013.01); *G09G 2340/12* (2013.01); *G09G 2360/02* (2013.01)

(58) Field of Classification Search
USPC ............................ 715/759, 777, 779; 345/3.1
See application file for complete search history.

(56) References Cited

U.S. PATENT DOCUMENTS

| | | | | |
|---|---|---|---|---|
| 5,179,654 A * | 1/1993 | Richards et al. | ............... | 715/708 |
| 5,179,655 A * | 1/1993 | Noguchi et al. | ............... | 715/797 |
| 5,227,771 A * | 7/1993 | Kerr et al. | .................... | 715/800 |
| 5,546,525 A * | 8/1996 | Wolf et al. | .................... | 715/809 |
| 5,548,702 A * | 8/1996 | Li et al. | .......................... | 715/769 |
| 5,570,135 A * | 10/1996 | Gove et al. | .................... | 348/581 |
| 5,621,879 A * | 4/1997 | Kohda | .......................... | 715/803 |
| 5,633,655 A * | 5/1997 | Hara | ............................. | 345/698 |
| 5,712,995 A * | 1/1998 | Cohn | ............................. | 715/792 |
| 6,008,809 A * | 12/1999 | Brooks | ........................ | 715/792 |
| 6,069,628 A * | 5/2000 | Farry et al. | .................... | 715/835 |
| 6,111,582 A * | 8/2000 | Jenkins | ........................ | 345/421 |
| 6,119,147 A * | 9/2000 | Toomey et al. | ................ | 709/204 |
| 6,151,020 A * | 11/2000 | Palmer et al. | ................ | 715/733 |
| 6,326,970 B1 * | 12/2001 | Mott et al. | .................... | 345/667 |
| 6,459,440 B1 * | 10/2002 | Monnes et al. | ............... | 715/808 |
| 6,509,898 B2 * | 1/2003 | Chi et al. | ....................... | 345/440 |
| 6,640,166 B2 * | 10/2003 | Liebl et al. | ................... | 701/29.1 |
| 6,759,996 B1 * | 7/2004 | Someya et al. | ................ | 345/1.1 |
| 6,784,855 B2 * | 8/2004 | Matthews et al. | ............. | 345/1.1 |
| 6,982,682 B1 * | 1/2006 | Kaulgud et al. | ............... | 345/1.1 |
| 7,136,042 B2 * | 11/2006 | Magendanz et al. | .......... | 345/100 |
| 7,161,557 B2 * | 1/2007 | Thornton | ....................... | 345/2.1 |
| 7,193,583 B2 * | 3/2007 | Zerphy et al. | .................. | 345/1.3 |
| 7,667,707 B1 * | 2/2010 | Margulis | ....................... | 345/519 |
| 7,812,786 B2 * | 10/2010 | Etelapera | ...................... | 345/3.3 |

(Continued)

FOREIGN PATENT DOCUMENTS

JP 6-282396 10/2004

*Primary Examiner* — Phenuel Salomon

(74) *Attorney, Agent, or Firm* — Fitzpatrick, Cella, Harper & Scinto

(57) ABSTRACT

A display control apparatus determines if an application manager has attribute information compatible with attribute information of a selected application program, and controls the application manager which is determined to have the attribute information compatible with the attribute information of the application program to execute display processing of the application program.

12 Claims, 8 Drawing Sheets

(56) References Cited

U.S. PATENT DOCUMENTS

| | | | |
|---|---|---|---|
| 2002/0154320 A1* | 10/2002 | Kagaya | 358/1.2 |
| 2002/0167459 A1* | 11/2002 | Baudisch et al. | 345/1.3 |
| 2004/0046707 A1* | 3/2004 | Mori et al. | 345/1.1 |
| 2004/0212610 A1* | 10/2004 | Hamlin | 345/211 |
| 2004/0222941 A1* | 11/2004 | Wong et al. | 345/1.1 |
| 2006/0248404 A1* | 11/2006 | Lindsay et al. | 714/38 |
| 2007/0180401 A1* | 8/2007 | Singh et al. | 715/794 |
| 2008/0272984 A1* | 11/2008 | Kizaki | 345/3.1 |

* cited by examiner

FIG. 4

| ATTRIBUTE NAME | VALUE 1 | VALUE 2 | VALUE 3 | VALUE 4 |
|---|---|---|---|---|
| DISPLAY RESOLUTION | 800 × 600 | 640 × 480 | 320 × 240 | ⋮ |
| UI COMPONENT INFORMATION | Advanced UI | Classic UI | ⋮ | ⋮ |
| NUMBER OF COLORS | 256 | FULL-COLOR | ⋮ | ⋮ |
| VERSION INFORMATION | 1.0 | 2.0 | ⋮ | ⋮ |
| TRANSPARENT PROCESSING INFORMATION | 2 TONES | 256 TONES | ⋮ | ⋮ |
| ⋮ | | | | |

… (US 9,105,222 B2)

DISPLAY CONTROL APPARATUS AND DISPLAY CONTROL METHOD

BACKGROUND OF THE INVENTION

1. Field of the Invention

The present invention relates to a display control apparatus and display control method.

2. Description of the Related Art

An application manager is a program which handles a window to be displayed and a position and size of the window in a screen display corresponding to an application (e.g., appearance of components). Conventionally, one application manager exists per system, and concurrently manages a plurality of applications by switching windows and tabs. In this case, the application manager displays an application configured by predetermined UI design components on a screen having a predetermined size to have the predetermined number of colors.

For example, Japanese Patent Laid-Open No. H6-282396 discloses a technique which acquires an event at the time of execution of a program, and changes a screen interface in accordance with the acquired event.

However, in recent years, the performance of a display system is improved since the display resolution increases, the number of colors specifies a full-color, and transparency having tones can be set. When an old application is to be used under an application manager having a new function, it is required for each individual application to change the display resolution (or size) and the number of colors and to modify UI (User Interface) components.

With the technique disclosed in Japanese Patent Laid-Open No. H6-282396 above, an event generation point has to be set in an application in advance.

The present invention allows to use various applications without modifying the applications. Other features of the present invention will be apparent from the following description of the embodiments.

SUMMARY OF THE INVENTION

According to one aspect of the present invention, a display control apparatus for controlling a screen display on a display unit, comprises: a determination unit which determines whether or not a plurality of application managers have attribute information compatible with attribute information of a selected application program; and a control unit which controls the application manager which is determined by the determination unit to have the attribute information compatible with the attribute information of the application program to execute display processing corresponding to the application program.

According to another aspect of the present invention, a display control method for controlling a screen display on a display unit, comprises: a determination step of determining whether or not a plurality of application managers have attribute information compatible with attribute information of a selected application program; and a control step of controlling the application manager which is determined in the determination step to have the attribute information compatible with the attribute information of the application program to execute display processing corresponding to the application program.

According to the present invention, a technique that allows to use various applications without modifying the applications can be provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing the configuration of attribute information of an application and that of an application manager;

DESCRIPTION OF THE EMBODIMENTS

Preferred embodiments to which the present invention is applied will be described in detail hereinafter with reference to the accompanying drawings. A system which includes a plurality of application managers used to manage the configurations of display screens corresponding to a plurality of application programs (to be simply referred to as "applications" hereinafter) upon switching these applications will be described hereinafter.

(First Embodiment)

Figure 1:
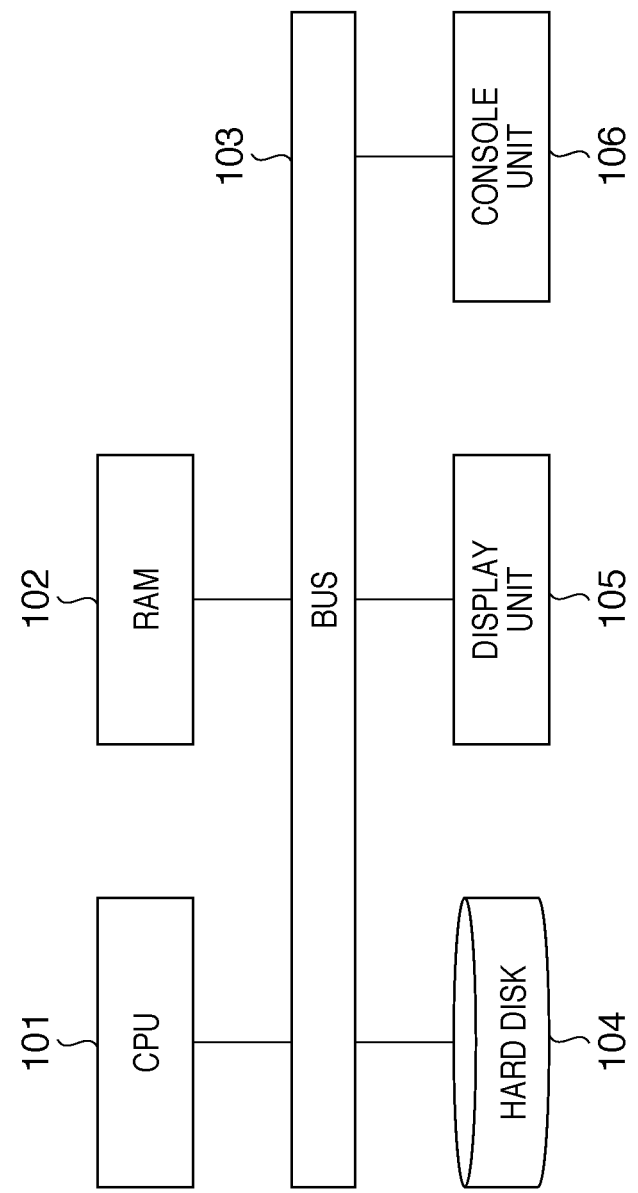
FIG. 1 is a block diagram showing the arrangement of an application management system according to an embodiment of the present invention.

FIG. 1 is a block diagram showing the arrangement of an application management system according to the first embodiment of the present invention. Referring to FIG. 1, reference numeral 101 denotes a CPU (Central Processing Unit) which controls the overall system. Reference numeral 102 denotes a RAM (Random Access Memory) which temporarily stores programs supplied from an external apparatus or the like, data acquired from a database, and intermediate data during execution of a program. Reference numeral 103 denotes a bus which interconnects respective devices. Reference numeral 104 denotes a hard disk which is fixedly arranged in the system, and stores programs required to control the system and information acquired from the RAM 102. Reference numeral 105 denotes a display unit which is used to display a user interface. Reference numeral 106 denotes a console unit on which the user makes operations, and information according to an operation on this console unit is input.

Note that a display with a touch panel obtained by integrating the console unit 106 with the display unit 105 may be used.

In the first embodiment, application managers can be switched using display resolution information included in attribute information of applications and that included in the application managers.

Figure 2:
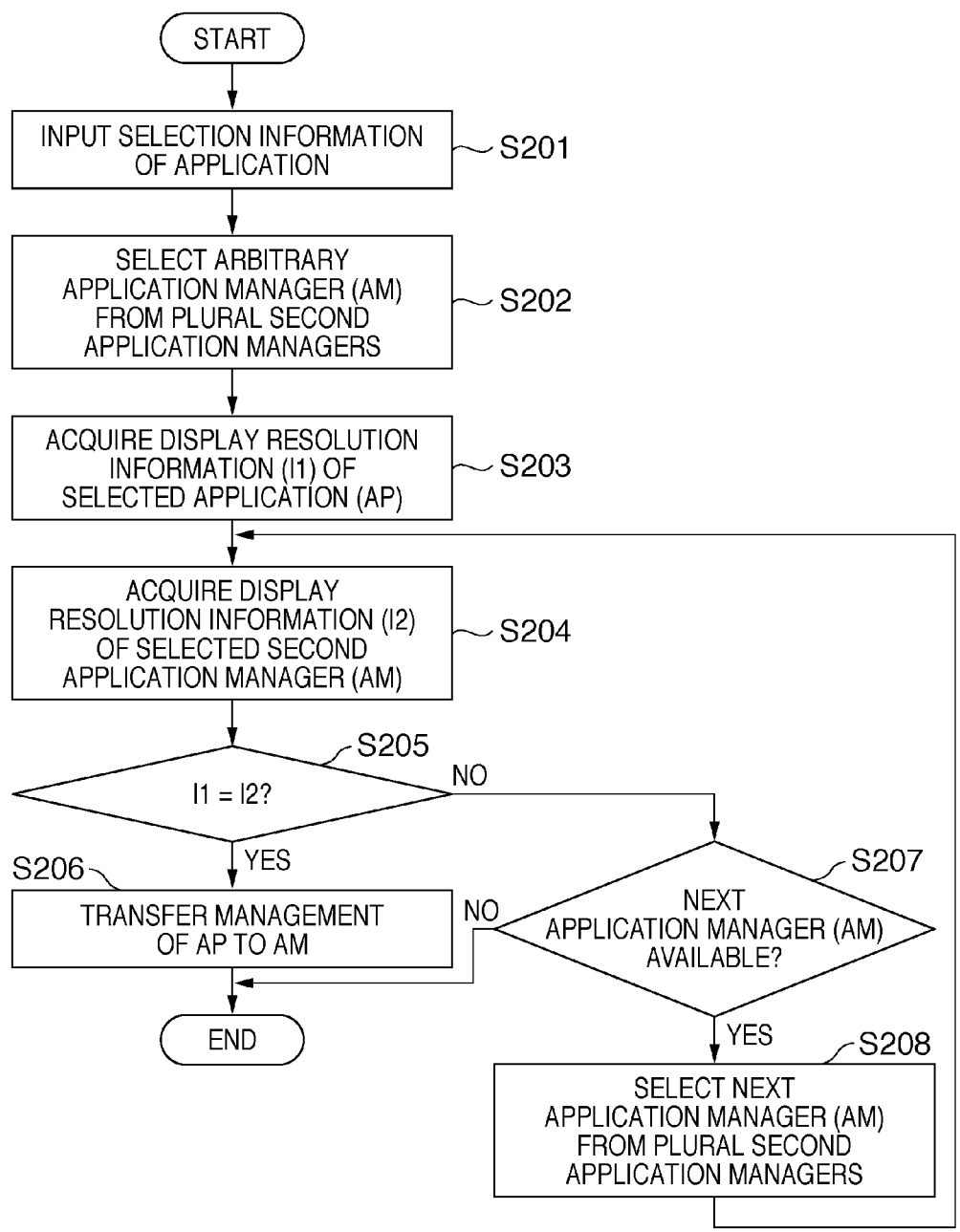
FIG. 2 is a flowchart showing the sequence of processing of the application management system according to the first embodiment of the present invention.

FIG. 2 is a flowchart showing the sequence of processing of the application management system according to the first embodiment, and shows the processing from when the user selects an application until a screen is displayed.

FIG. 4 is a view showing the configuration of attribute information of applications and that of application managers. As shown in FIG. 4, the attribute information of applications and that of application managers have attribute names such as "display resolution", "UI component information", "the number of colors", "version information", and "transparent processing information", each of which holds one or more attribute values.

Figure 5:
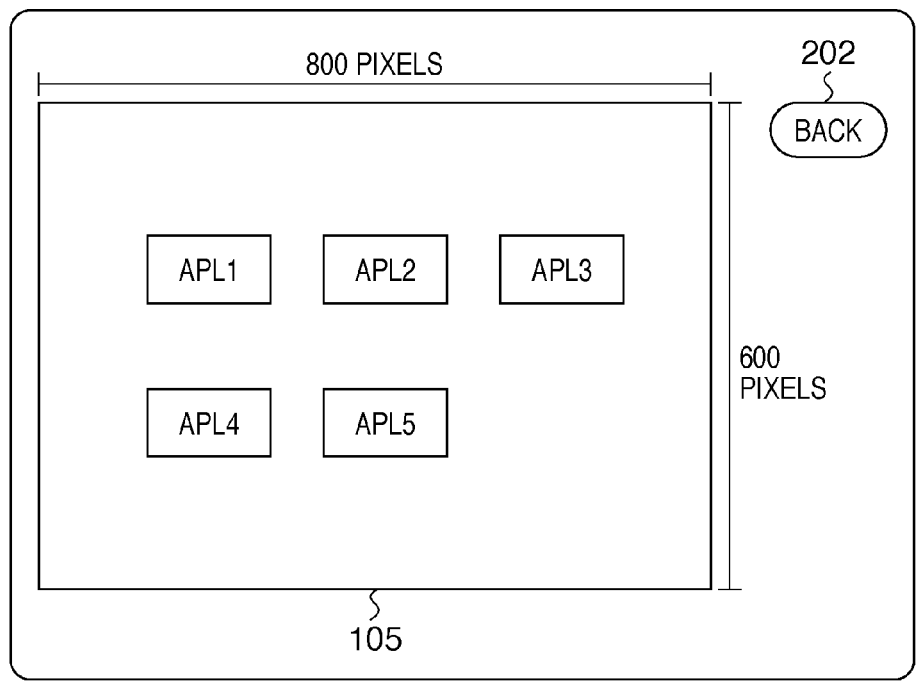
FIG. 5 is a view showing a display example of an application selection screen.

In the description of the first embodiment, display resolution information of these pieces of attribute information is focused. As shown in FIG. 5, a screen, the initiative of which is seized by a first application manager, is displayed on the display unit 105, and one or more applications (five applications APL1 to APL5 in FIG. 5) are selectably displayed on that screen. The applications displayed on the display unit 105 in FIG. 5 are managed by the first application manager. The first application manager and second application managers to be described later are programs to be executed by the CPU 101 as a computer. The programs of the first and second application managers are stored in the hard disk 104 as a storage medium, so that they can be read out by the CPU 101. The CPU 101 reads out these programs from the hard disk 104, and executes them.

The user selects an arbitrary application to be displayed from the plurality of applications APL1 to APL5 managed on the first application manager. The first application manager inputs selection information of the application selected by the user in step S201.

The first application manager manages one or more second application managers. The first application manager selects an arbitrary one of the one or more second application managers managed by itself in step S202.

In step S203, the first application manager acquires display resolution information from the attribute information of the application selected in step S201. This attribute information is stored in the hard disk 104 or RAM 102. Assume that a display resolution of 800×600 is set in the acquired display resolution information. Note that the "800×600" resolution is also called an SVGA resolution.

In step S204, the first application manager acquires display resolution information from the attribute information of the second application manager. This attribute information is stored in the hard disk 104 or RAM 102. Assume that a display resolution of 800×600 is set in the acquired display resolution information.

In step S205, the first application manager compares the display resolution set by the display resolution information acquired in step S203 and that set by the display resolution information acquired in step S204 to see if they are equal to each other. That is, in step S205 the first application manager executes compatibility determination between the attribute information of the application and that of the second application manager. In this case, since the two display resolutions match (800×600), the process advances to step S206.

Figure 6:
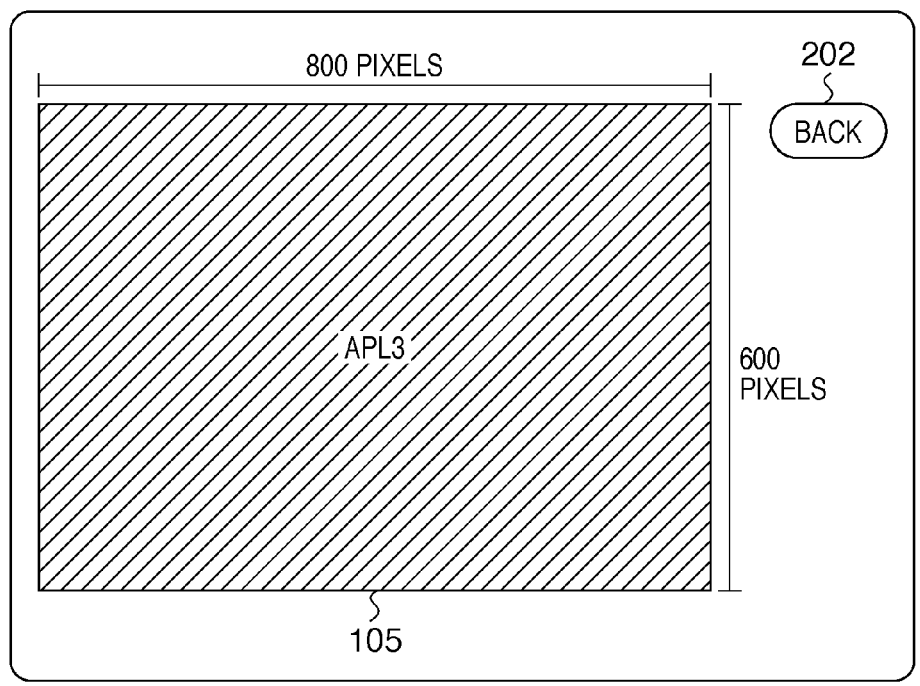
FIG. 6 is a view showing a display example of an application using a full display area of a display unit.

In step S206, the first application manager transfers the processing of the application selected in step S201 to the second application manager selected in step S202. Therefore, the display processing of this application is executed by the second application manager. As a result, the application manager transferred with the processing displays, on a screen having the fixed resolution (800×600) (size), the application configured by fixed UI design components to have the fixed number of colors. For example, as shown in FIG. 6, the application (APL3) is appropriately displayed using the full display area of the display unit 105 having the display resolution of 800×600.

As another example, assume that a display resolution of 640×480 is set in the display resolution information of the application acquired in step S203. Note that the "640×480" resolution is also called a VGA resolution. In addition, assume that a display resolution of 800×600 is set in the display resolution information of the second application manager acquired in step S204. In this case, it is determined in step S205 that the two display resolutions do not match. Therefore, the process advances to step S207, and the first application manager does not use the second application manager selected in step S202 and checks if the next second application manager is available.

If the next second application manager is available, the first application manager selects that second application manager in step S208, and acquires display resolution information from the attribute information of that second application manager (step S204). Assume that a resolution of 640×480 is set in the display resolution information of the second application manager selected at this time. In this case, it is determined in step S205 that the two display resolutions match. Therefore, the process advances to step S206, and the first application manager transfers the processing of the application selected in step S201 to the second application manager selected in step S208. As a result, the application manager transferred with the processing displays, on a screen having the fixed resolution (640×480) (size), the application configured by fixed UI design components to have the fixed number of colors. For example, as shown in FIG. 7, the second application manager displays the application (APL3) using a 640×480 display area of the display unit 105.

Note that if it is determined in step S207 that the next second application manager is not available, the processing ends.

As described above, the display resolution of the application often does not match that of the second application manager selected first. In this case, by selecting the next compatible second application manager, the application can be appropriately displayed, as shown in FIG. 7.

Figure 7:
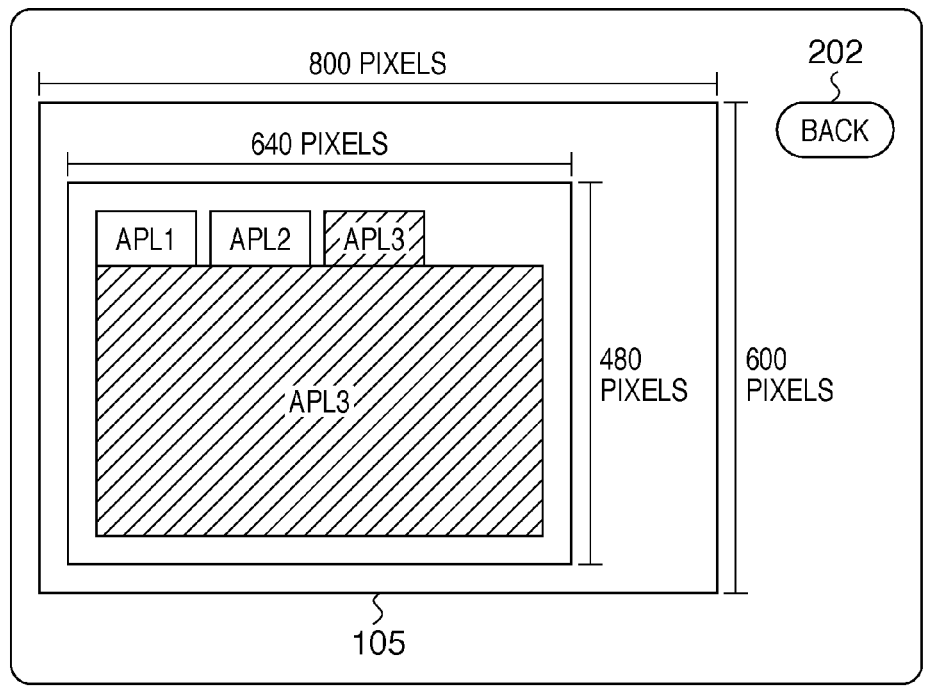
FIG. 7 is a view showing a display example of an application using a partial display area of the display unit.

Upon returning the control from the second application manager to the first application manager, a back button 202 shown in FIG. 7 is used. As another example, the control may be returned to the first application manager using a GUI button component in the display unit 105 or a voice operation.

Also, an application manager compatible with the required display resolution of the application is often not found. In such case, the control may be expanded using a second application manager having different attribute information in which a display resolution is, e.g., 320×240. Note that the "320×240" resolution is also called a QVGA resolution. Furthermore, upon introducing a new second application manager, the second application managers can be similarly expanded. Moreover, the first application manager often serves as the second application manager.

In the first embodiment, the second application manager to be used is selected at the time of execution of the application. As another example, at the time of installation of an application in the system in place of the execution timing of the application, a second application manager used by that application may be associated with the application in advance.

(Second Embodiment)

The second embodiment of the present invention will be described below. The second embodiment is different from the first embodiment only in the processes in steps S203 to S205 in FIG. 2. Also, in the description of the second embodiment, version information of the attribute information shown in FIG. 4 is focused. Note that the arrangement of the application management system according to the second embodiment is the same as that (FIG. 1) in the first embodiment.

In the process corresponding to step S203 in FIG. 2, the first application manager acquires version information from attribute information of the application selected in step S201. Assume that version 2.0 is set in the acquired version information.

In the process corresponding to step S204, the first application manager acquires version information from attribute information of the second application manager. Assume that version 2.0 is set in the acquired version information.

In the processing corresponding to step S205, the first application manager determines if the version set by the version information acquired by the process corresponding to step S203 matches that set by the version information acquired by the process corresponding to step S204. In this case, since the two versions match (version 2.0), the process advances to step S206.

In step S206, the first application manager transfers the processing of the application selected in step S201 to the second application manager selected in step S202. As a result, as shown in FIG. 6, this second application manager appropriately displays the application (APL3) using the full display area of the display unit 105 having a display resolution of 800×600, which is designated by the display resolution information of the application.

As another example, assume that version 1.0 is set in the version information of the application acquired by the process corresponding to step S203. Also, assume that version 2.0 is set in the version information of the second application manager acquired by the process corresponding to step S204. In this case, it is determined in the process corresponding to step S205 that the two versions do not match. Therefore, the process advances to step S207, and the first application manager does not use the second application manager selected in step S202 and checks if the next second application manager is available.

If the next second application manager is available, the first application manager selects that second application manager in step S208. The first application manager acquires version information from attribute information of that second application manager (the process corresponding to step S204). Assume that version 1.0 is set in the version information of the second application manager selected at this time. In this case, it is determined in the process corresponding to step S205 that the two versions match. Therefore, the process advances to step S206, and the first application manager transfers the processing of the application selected in step S201 to the second application manager selected in step S208. As a result, as shown in FIG. 7, this second application manager appropriately displays the application (APL3) of an old version using a 640×480 display area of the display unit 105 having the display resolution of 800×600.

As a result, when the version of the application does not match that of the second application manager selected first, the next compatible second application manager is selected, thus appropriately displaying the application.

(Third Embodiment)

The third embodiment of the present invention will be described below. In the first and second embodiments described above, the second application manager is switched using the display resolution information or version information from the attribute information of the application and the second application manager. The third embodiment of the present invention will explain a method of switching the second application manager compatible with an application compositely from a plurality of pieces of attribute information in place of the display resolution information or version information alone. Note that the arrangement of the application management system according to this embodiment is the same as that shown in FIG. 1.

Figure 3:
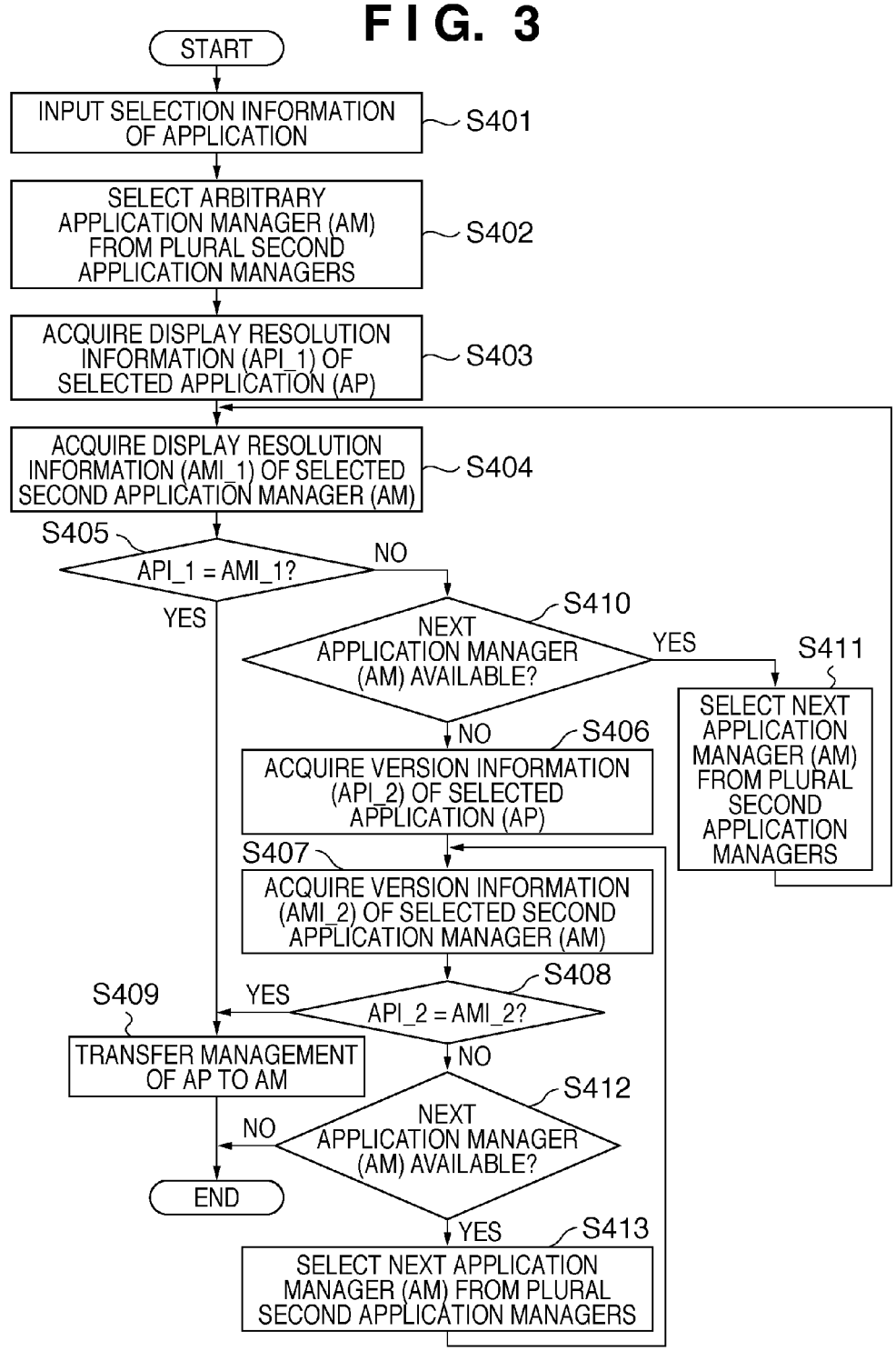
FIG. 3 is a flowchart showing the sequence of processing of the application management system according to the third embodiment of the present invention.

FIG. 3 is a flowchart showing the sequence of processing of the application management system according to the third embodiment, and shows processing from when the user selects an application until a screen is displayed. In the description of this embodiment, two pieces of information, i.e., display resolution information and version information of the attribute information shown in FIG. 4 are focused.

Steps S401 to S404 are the same as steps S201 to S204 in FIG. 2. Assume that a display resolution of 640×480 is set in display resolution information of the application acquired in step S403. Furthermore, assume that a display resolution of 800×600 is set in display resolution information of the second application manager acquired in step S404.

In step S405, the first application manager compares the display resolution set by the display resolution information acquired in step S403 with that set by the display resolution information acquired in step S404 to see if they match. In this case, it is determined that the display resolutions do not match (640×480≠800×600), and the process advances to step S410.

The first application manager checks in step S410 if the next second application manager is available. If the next second application manager is available, the first application manager selects that second application manager in step S411. The subsequent processes are the same as those from step S204 in FIG. 2.

On the other hand, if the next second application manager is not available, the process advances to step S406. In step S406, the first application manager acquires version information from the attribute information of the application. Assume that version 1.0 is set in the acquired version information.

In step S407, the first application manager acquires version information from the attribute information of the second application manager. Assume that version 2.0 is set in the acquired version information.

The first application manager determines in step S408 if the version of the second application manager is compatible with that of the application. Note that the version information of the second application manager means that of the application which is compatible in terms of a screen display and functions. That is, the application manager of version 2.0 is compatible with the application of version 1.0.

If it is determined that the version of the second application manager is compatible with that of the application, the first application manager transfers the processing of the application to that second application manager in step S409. As a result, as shown in FIG. 8, the second application manager appropriately displays the application (APL3) by enlarging it to 800×600.

On the other hand, if the version of the second application manager is incompatible with that of the application, the first application manager determines in step S412 if the next second application manager is available. If the next second application manager is available, the process advances to step S413. On the other hand, if the next second application manager is not available, the processing ends. In step S413, the first application manager selects the next second application manager. After that, the processes from step S407 are repeated.

In this case, the display resolution of the application is 640×480, and that of the second application manager is 800×600. For this reason, the second application manager normally cannot display the application. However, the second application manager is compatible with version 1.0 of the application, and can display the application by an automatic enlargement function as its coping method if the display resolutions are different.

Figure 8:
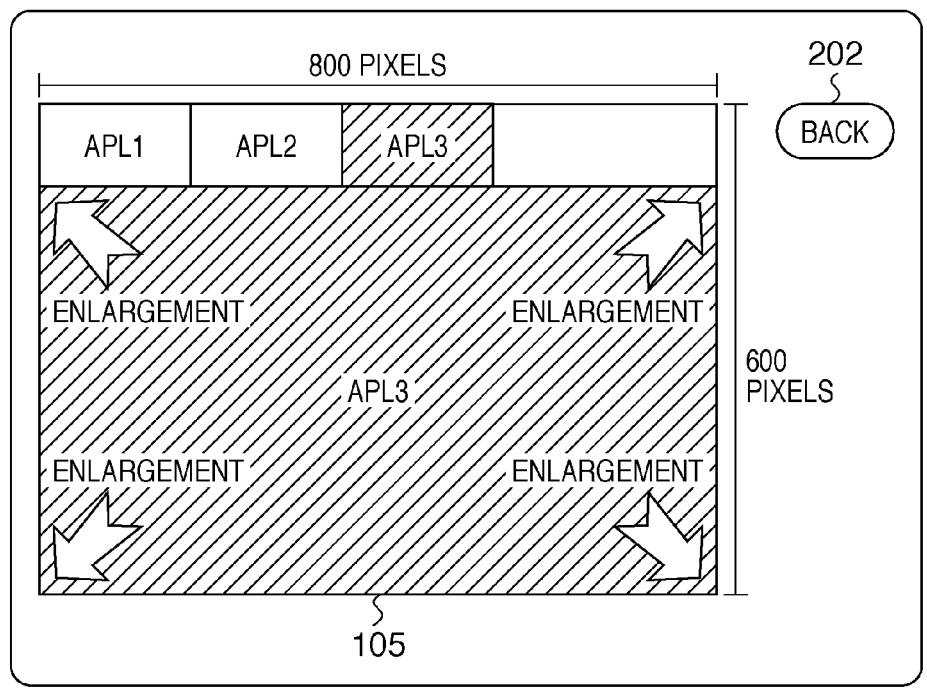
FIG. 8 is a view showing a display example of an application when an application manager has a version compatible with that of an application.
Figure 9:
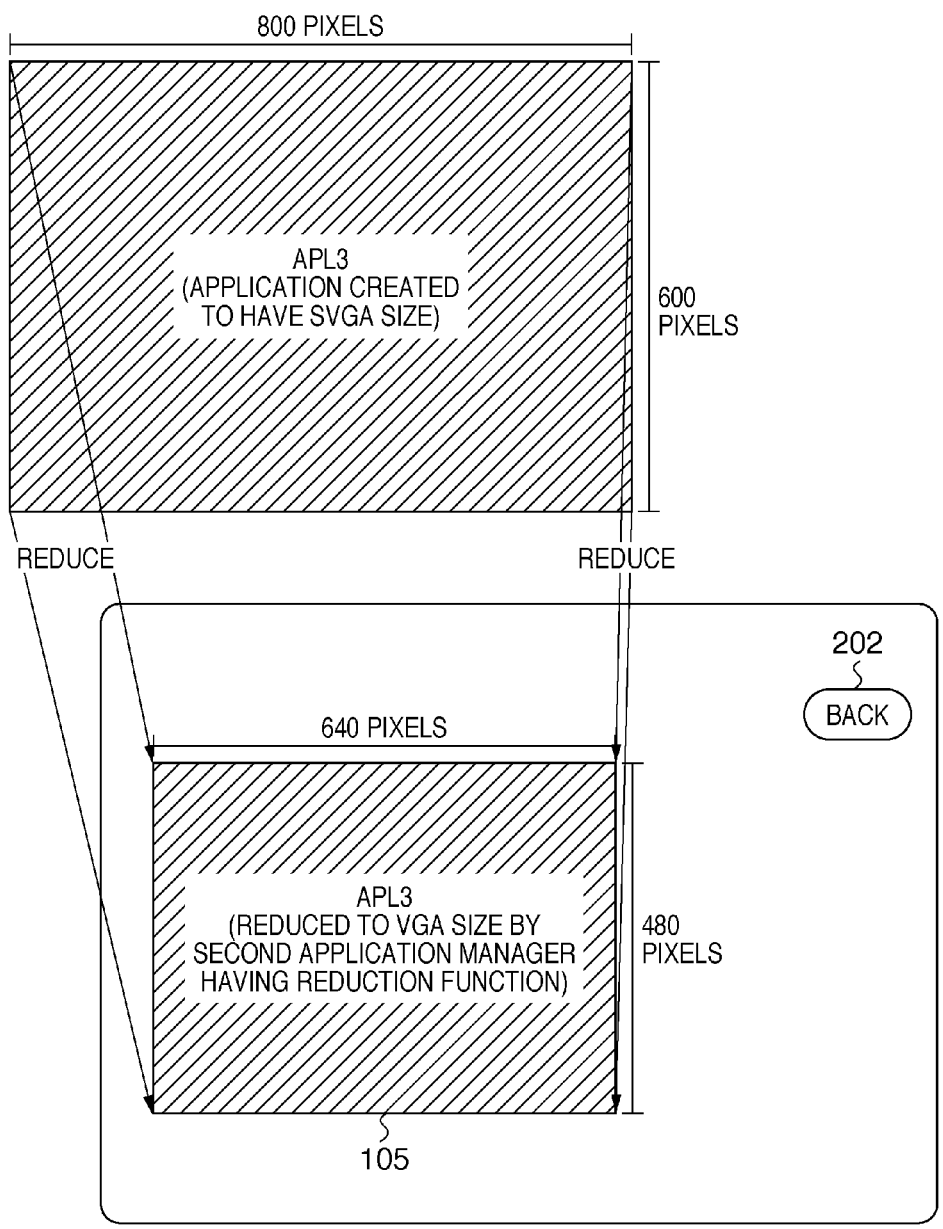
FIG. 9 is a view showing an example when a second application manager having a reduction display function displays a display screen corresponding to an application in a reduced scale.

In the above description and FIG. 8, the second application manager having the enlargement display function has been exemplified. Likewise, the second application manager effectively has a reduction display function. For example, as shown in FIG. 9, an application (APL3) created to have an SVGA size can be displayed since it is reduced to a VGA size by the second application manager having the reduction display function.

As described above, when the display resolutions are different, the application can be appropriately displayed when the second application manager has an automatic GUI component layout function or an enlargement/reduction display function.

An Advanced UI in "UI component information" in FIG. 4 indicates a UI which has, for example, good appearance of the shapes of UI components, and also has a function of automatically laying out GUI components in correspondence with a screen size upon displaying them on a screen. "UI component information" may be set in the application and application manager, and may be used upon selection of the application manager. Furthermore, information indicating UI components that can be used even in an enlarged or reduced scale may be set.

Likewise, a Classic UI indicates a conventional GUI which has, for example, a fixed screen size, and low functionality of GUI components that define a screen display.

In this way, using another attribute information such as version information in addition to display resolution information, a more appropriate application manager can be selected.

According to the third embodiment, even a new device compatible with a display resolution of 800×600 can appropriately display an application of an old version which is set with a display resolution of 640×480 without modifying the application. For this reason, in the new device whose display resolution is enlarged to 800×600, an appropriate application manager can be selected and operated, thus maintaining downward compatibility of an application execution environment.

Note that the present invention is not limited to the attribute information (display resolution information and version information) used in the third embodiment, and other kinds of attribute information such as UI component information, the number of colors, and transparent mode information may be used.

As another selection method of the second application manager, priorities are set for the attribute information of the application and second application manager to select the appropriate second application manager.

In the third embodiment, the display resolutions are compared first, and the two pieces of version information are compared next. However, the present invention is not limited to such specific comparison order of attribute information. In this embodiment, this processing order has been exemplified under the assumption that the first application manager is set to have information indicating that the display screen information has a higher priority than the version information. That is, the first application manager can execute compatibility determination of attributes set in the attribute information of the application and that of the second application manager in turn from the attributes with higher priorities with reference to priority information of respective attributes set in the attribute information. Note that the priority information is stored in, e.g., the hard disk 104 or RAM 102, and is loaded by the first application manager (CPU 101) as needed.

Also, an evaluation function used to determine a degree of compatibility of the attribute information of the application and second application manager may be used. For example, the application and second application manager may be determined to be compatible when the display resolution is 800×600 and the version is 1.0. Furthermore, the priority order may be set by weighting attribute information in the evaluation function.

In the aforementioned embodiments, the first application manager transfers the processing to the second application manager compatible with the attributes of the application. For this reason, a change in performance of a device can be flexibly coped with, and the application can be appropriately displayed. As a result, even an application developed for an old device can appropriately run on a new device. Therefore, the previous application resources can be effectively used, and the load on the application developer side due to device transition can be reduced.

Figure 10:
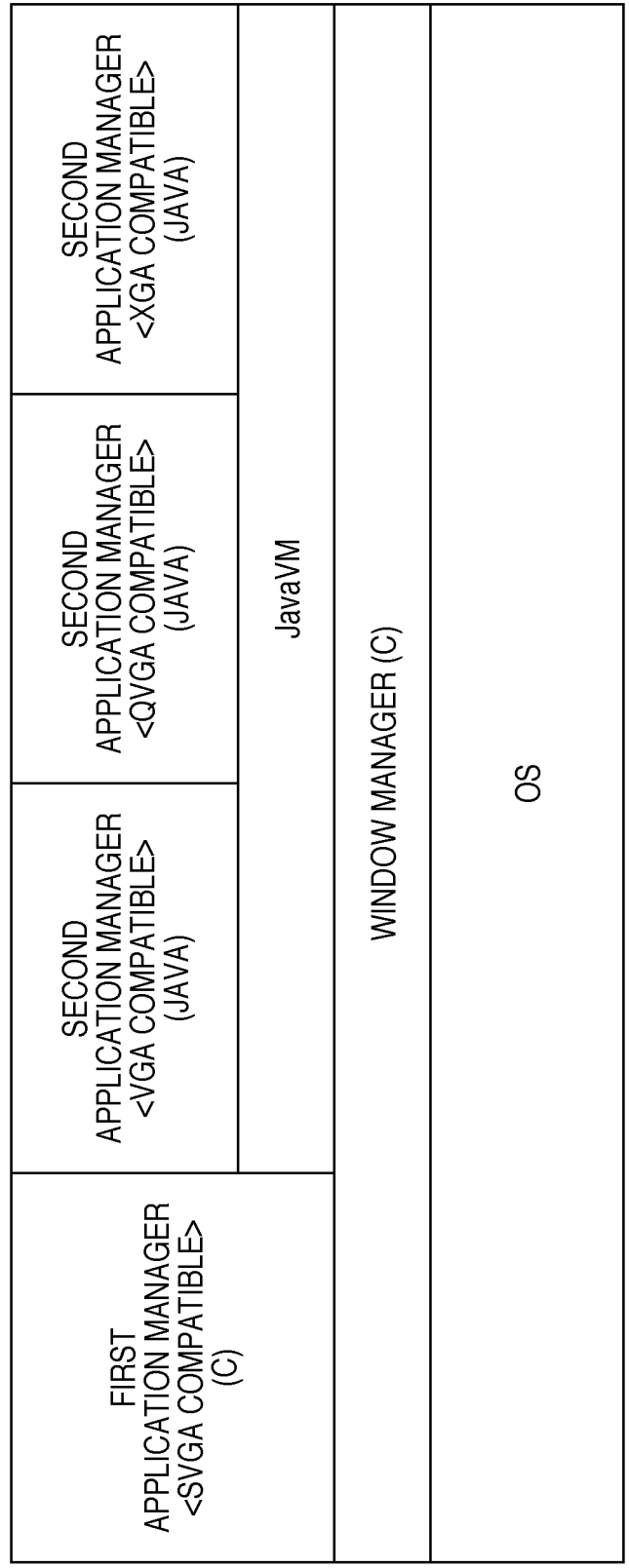
FIG. 10 is a view showing an example when a first application manager is implemented by C, and each second application manager is implemented by JAVA™.

The implementation methods of the first and second application managers described in the first to third embodiments above will be described below. For example, as shown in FIG. 10, the first application manager is implemented by C, and each second application manager is implemented by JAVA™.

Note that a window manager in a window system manages a window itself, but it does not grasp the display contents on the window. The window management includes opening, closing, moving, and resizing of a window, control of depth ordering of windows, setting of an active window (focus), and the like. Also, the window management issues, e.g., a re-drawing request when an overlapping part has to be re-drawn after movement of overlapping windows.

Since the window manager which depends on an OS (Operating System) and hardware is normally implemented by C, the application manager which controls switching of applications has to be implemented by C. For this reason, the application manager (first application manager) implemented by C has poor isolation between the application manager and window manager. For this reason, when the function of the window manager is changed, it takes much time to modify the application manager implemented by C.

On the other hand, in the application manager (second application manager) implemented by JAVA, JAVA VM (Virtual Machine) absorbs a connected part with the window manager. For this reason, even when the function of the window manager is changed, the second application manager (JAVA) requires nearly no modification.

In this manner, when the application manager is implemented by JAVA, it can be interchanged like an application, thus improving the flexibility of serviceability and expandability. Furthermore, a plurality of application managers having different functions can run at the same time, and an unneeded application manager can be deleted.

Units and steps that configure the aforementioned embodiments of the present invention can be implemented when a program stored in a RAM, ROM, or the like of a computer runs. This program and a computer-readable recording medium which records the program are included in the present invention.

The present invention can be practiced as embodiments in the form of, for example, a system, apparatus, method, program, or recording medium, and may be applied, in particular, to an apparatus including a single device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-146178, filed Jun. 3, 2008, which is hereby incorporated by reference herein in its entirety.

What is claimed is:

1. An application management apparatus for managing an application, comprising:
   a CPU and memory, functioning as:
      a plurality of application managers, which includes a first and a second application manager, said second application manager having second attribute information indicating an application display configuration which said second application manager manages, wherein the application display configuration is different from a first application display configuration which said first application manager manages;
      a selection unit, which selects said second application manager from among said plurality of application managers, if the second attribute information matches attribute information indicating an application display configuration of a specified application program being managed by said first application manager; and
      a transfer unit, which transfers management of the application display configuration of said specified application program from said first application manager to said second application manager, if said second application manager is selected by said selection unit,
      wherein said selection unit executes a compatibility determination between the attribute information of the specified application program and attribute information of one of said plurality of application managers by determining if at least one attribute set in the attribute information of the specified application program is equal to an attribute set in the attribute information of said one of said plurality of application managers.

2. The apparatus according to claim 1, wherein said second application manager executes display processing of the specified application program so as to display a screen of the specified application program at the attribute of a display resolution according to said second application manager.

3. The apparatus according to claim 1, wherein said selection unit executes the compatibility determination of the attributes respectively set in the attribute information of the specified application program and the attribute information of said one of said plurality of application managers in turn from attributes with higher priorities based on priority information of the attributes set in the attribute information.

4. The apparatus according to claim 1, wherein each of the attribute information of the specified application program and the second attribute information includes at least one of an attribute of a display resolution, an attribute of a version, an attribute of a UI component to be used, an attribute of a number of colors, an attribute of programming language, and an attribute of transparent processing.

5. The apparatus according to claim 4, wherein the attribute of a UI component includes UI component information which indicates the design type of the UI component.

6. The apparatus according to claim 1, wherein said first application manager specifies the application program, from a plurality of application programs, which is to undergo display processing.

7. An application management method for managing an application, comprising steps of:
   selecting, from among a plurality of application managers which includes a first and a second application manager, the second application manager, where the second application manager has second attribute information indicating an application display configuration which the second application manager manages, wherein the application display configuration is different from a first application display configuration which said first application manager manages, if the second attribute information matches attribute information indicating an application display configuration of a specified application program being managed by said first application manager;
   transferring management of the application display configuration of the specified application program from the first application manager to the second application manager, if the second application manager is selected in the selecting step; and
   executing a compatibility determination between the attribute information of the specified application program and attribute information of one of said plurality of application managers by determining if at least one attribute set in the attribute information of the specified application program is equal to an attribute set in the attribute information of said one of said plurality of application managers.

8. The method according to claim 7, further comprising a step of executing, by the second application manager, display processing of the specified application program so as to display a screen of the specified application program at the attribute of a display resolution according to the second application manager.

9. The method according to claim 7, wherein the selecting step is executed by the first application manager so as to determine if the second application manager has compatible attribute information, and the transferring step is executed by the first application manager so as to control the second application manager to execute display processing of the specified application.

10. A non-transitory computer-readable recording medium storing a program that when executed causes a computer to perform a method of managing an application, the method comprising steps of:
   selecting, from among a plurality of application managers which includes a first and a second application manager, the second application manager, where the second application manager has second attribute information indicating an application display configuration which the second application manager manages, wherein the application display configuration is different from a first application display configuration which said first application manager manages, if the second attribute information matches attribute information indicating an application display configuration of a specified application program being managed by said first application manager;
   transferring management of the application display configuration of the specified application program from the first application manager to the second application manager, if the second application manager is selected in the selecting step; and executing a compatibility determination between the attribute information of the specified application program and attribute information of one of said plurality of application managers by determining if at least one attribute set in the attribute information of the specified application program is equal to an attribute set in the attribute information of said one of said plurality of application managers.

11. The medium according to claim 10, wherein the method further comprises a step of executing, by the second application manager, display processing of the specified application program so as to display a screen of the specified application program at the attribute of a display resolution according to the second application manager.

12. The medium according to claim 10, wherein the selecting step is executed by the first application manager so as to determine if the second application manager has compatible attribute information, and the transferring step is executed by the first application manager so as to control the second application manager to execute display processing of the specified application.

* * * * *